United States Patent
Drei et al.

(10) Patent No.: US 6,253,650 B1
(45) Date of Patent: Jul. 3, 2001

(54) HYDRAULIC COUPLING FOR FEEDING FLUID-DRIVEN ACTUATORS-PARTICULARLY HYDRAULIC MOTORS, MOUNTED ON A ROTATING STRUCTURE

(75) Inventors: Andrea Drei; Enrico Nenni, both of Faenza; Renato Mingozzi, Russi, all of (IT)

(73) Assignee: Iemca Giuliani Macchine Italia S.p.A., Faenza (IT)

( * ) Notice: Subject to any disclaimer, the term of this patent is extended or adjusted under 35 U.S.C. 154(b) by 0 days.

(21) Appl. No.: 09/124,747

(22) Filed: Jul. 29, 1998

(30) Foreign Application Priority Data

Sep. 4, 1997 (IT) ............................................. B097A0536

(51) Int. Cl.[7] ................................................... B23B 13/00
(52) U.S. Cl. .................................. 82/127; 82/126; 82/71; 82/80
(58) Field of Search ............................. 82/127, 125, 126, 82/71, 80, 11.4, 11.5

(56) References Cited

U.S. PATENT DOCUMENTS

| | | | |
|---|---|---|---|
| 2,577,203 | * 12/1951 | Mariotte | 414/17 |
| 2,641,969 | * 6/1953 | Roehm | 409/290 |
| 2,877,676 | * 3/1959 | Swanson et al. | 82/125 |
| 3,760,661 | * 9/1973 | Eichenhofer | 82/126 |
| 4,299,662 | 11/1981 | Hardin, Jr. . | |
| 4,423,651 | * 1/1984 | Hardee | 82/127 |
| 5,129,438 | * 7/1992 | Hamilton | 144/343 |

FOREIGN PATENT DOCUMENTS

| | | |
|---|---|---|
| 27 27 434 | 10/1978 | (DE) . |
| 40 38 660 | 6/1992 | (DE) . |
| 0 289 703 | 11/1988 | (EP) . |
| 0 299 083 | 1/1989 | (EP) . |
| 0 460 667 | 12/1991 | (EP) . |

\* cited by examiner

Primary Examiner—Henry Tsai
(74) Attorney, Agent, or Firm—Guido Modiano; Albert Josif; Daniel O'Byrne

(57) ABSTRACT

A hydraulic coupling for feeding hydraulic actuators, particularly for distributing pressurized oil to a plurality of hydraulic motors mounted on a rotating structure such as a drum feeder for feeding bars to an automatic multispindle lathe; the motors are angularly distributed around the rotation axis of the structure, and the coupling comprises a plurality of ducts which branch out axially from the structure and are angularly distributed with respect to the rotation axis; the ducts are connected to the delivery and the return of the motors at one end and, at the opposite end, by means of respective flexible hoses, to a stationary distributor for connecting the motors to a source of pressurized oil and to the oil discharge; the flexible hoses are arranged in a spiral around the rotation axis and have a length which allows the rotation of the structure with respect to the distributor through a preset angle; the distributor comprises valves for controlling the flexible hoses which are actuated so as to connect the intake and discharge of oil to and from the motors according to a programmed sequence.

8 Claims, 4 Drawing Sheets

US 6,253,650 B1

HYDRAULIC COUPLING FOR FEEDING FLUID-DRIVEN ACTUATORS-PARTICULARLY HYDRAULIC MOTORS, MOUNTED ON A ROTATING STRUCTURE

BACKGROUND OF THE INVENTION

The present invention relates to a hydraulic coupling for feeding fluid-driven actuators, particularly for distributing pressurized oil among a plurality of hydraulic motors mounted on a rotating structure. The invention can be used in particular in drum feeders for feeding bars to multispindle automatic lathes.

Conventionally a multispindle automatic lathe is a machine tool comprising a plurality of machining stations which are distributed around a horizontal axis and in which specific machining operations are performed on a bar fed by a feeder. These machinings are, for example, screw cutting, turning, end-facing, parting and so forth.

The bar feeder is substantially constituted by a drum which is rotated about said horizontal axis by said lathe and comprises a plurality of concentric tubular guides which are angularly distributed around the rotation axis; an advancement device is associated with each guide and causes the advancement of the bars, taken from a magazine and inserted in the guides, toward the lathe. At the end of each individual machining, the drum rotates by the same angle that lies between the individual stations, so that the front ends undergo successive machinings.

After the drum has completed a rotation through 360°, the machining cycle is complete and the machined part is removed, while a new bar segment is made to advance toward the lathe to undergo the intended machinings.

It is known to use, as a device for the advancement of each bar in the corresponding guide, a chain or another similar element provided with a bar pusher sliding in the guide and actuated by a fluid-driven motor. The pressurized fluid is distributed to the individual motors by using a rotary distributor which is mounted on the rotation axis of the drum and is provided with mechanical devices for controlling the delivery and return of the oil that feeds the motors. Conventional rotary distributors entail the drawback that they do not allow optimum use of the machining stations of the lathe in case of very simple machinings of the parts. For example, if the simple parting of parts from a bar and the forming of a bore at one end are required, most of the machining stations are not used and act only as transit stations.

SUMMARY OF THE INVENTION

The aim of the present invention is to provide a hydraulic coupling for feeding fluid-driven actuators which allows to vary at will the number of stations in which the bars to be machined are advanced, so as to increase the number of stations in which machinings are performed and thus fully utilize the production capacity of the lathe.

Within the scope of this aim, an object of the present invention is to provide a coupling which is structurally simpler than conventional rotary couplings and is therefore cheaper and safer in operation.

This aim and this object are achieved with a hydraulic coupling for feeding hydraulic actuators, particularly for distributing pressurized oil to a plurality of hydraulic motors mounted on a rotating structure such as a drum feeder for feeding bars to an automatic multispindle lathe, said motors being angularly distributed around the rotation axis of said structure, characterized in that it comprises a plurality of ducts which branch out axially from said structure and are angularly distributed with respect to said rotation axis, said ducts being connected to the delivery and the return of said motors at one end and, at the opposite end, by means of respective flexible hoses, to a stationary distributor for connecting said motors to a source of pressurized oil and to the oil discharge, said flexible hoses being arranged in a spiral around said rotation axis and having a length which allows the rotation of said structure with respect to said distributor through a preset angle, said distributor comprising valves for controlling said flexible hoses which are actuated so as to connect the intake and discharge of oil to and from said motors according to a programmed sequence.

BRIEF DESCRIPTION OF THE DRAWINGS

Further characteristics and advantages of the present invention will become apparent from the following detailed description of a preferred embodiment, illustrated only by way of non-limitative example in the accompanying drawings, wherein.

DESCRIPTION OF THE PREFERRED EMBODIMENTS

Figure 1:
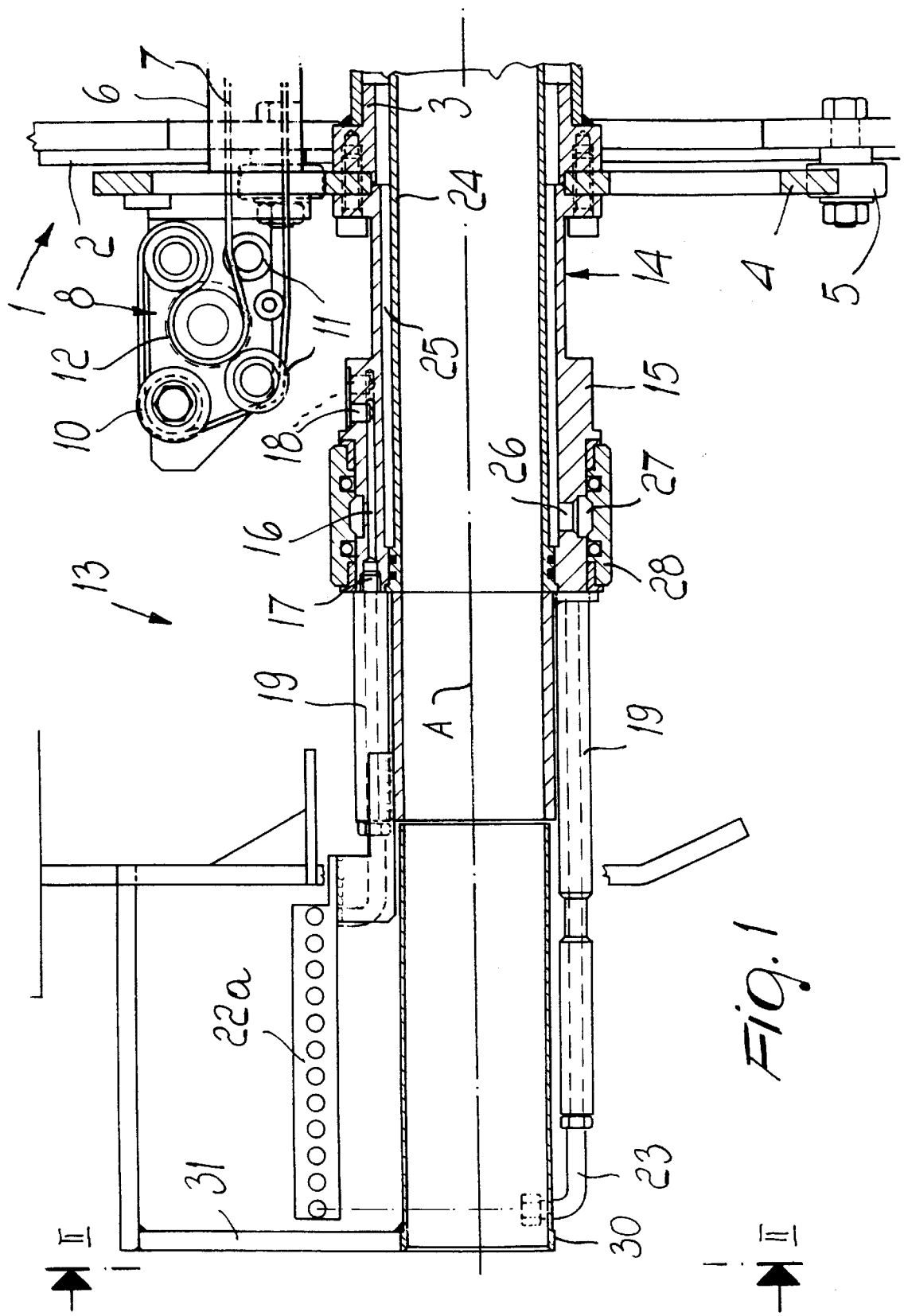
FIG. 1 is a longitudinal sectional view of a coupling for feeding pressurized oil to multiple hydraulic motors mounted on a drum feeder for feeding bars to a multispindle automatic lathe.
Figure 2:
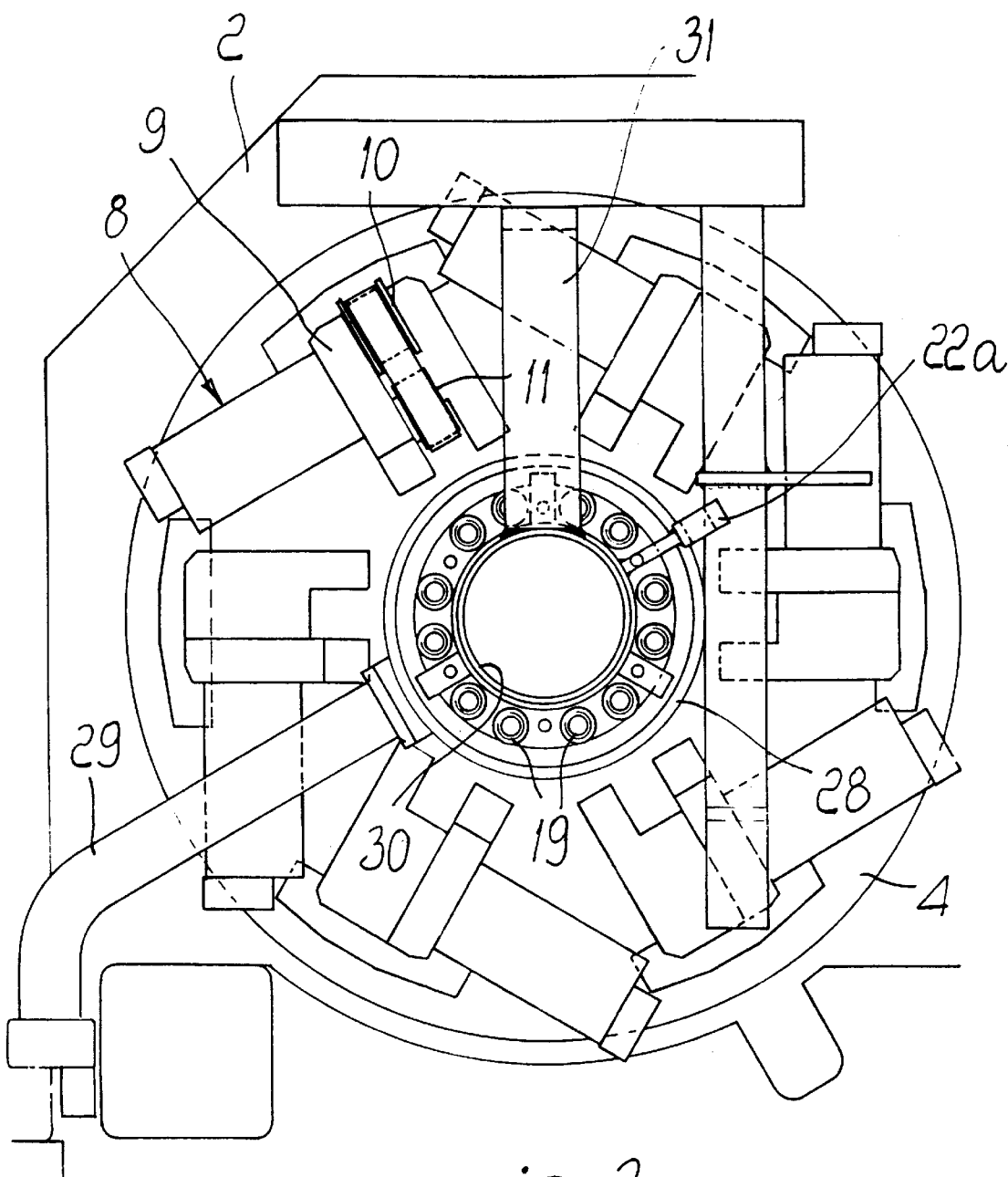
FIG. 2 is a transverse sectional view, taken along the plane II—II of FIG. 1.
Figure 3:
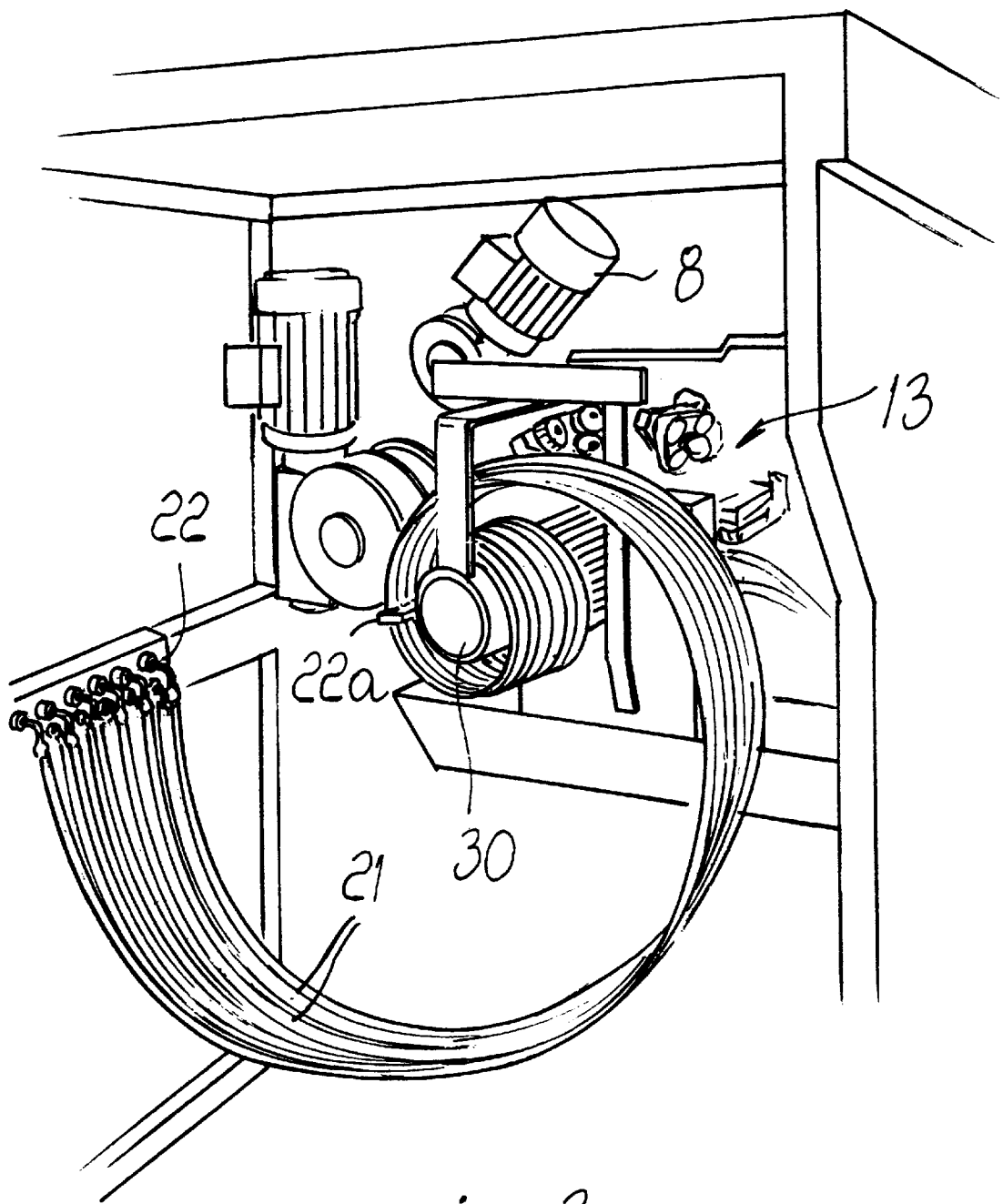
FIGS. 3 and 4 are two perspective views of the coupling.
Figure 4:
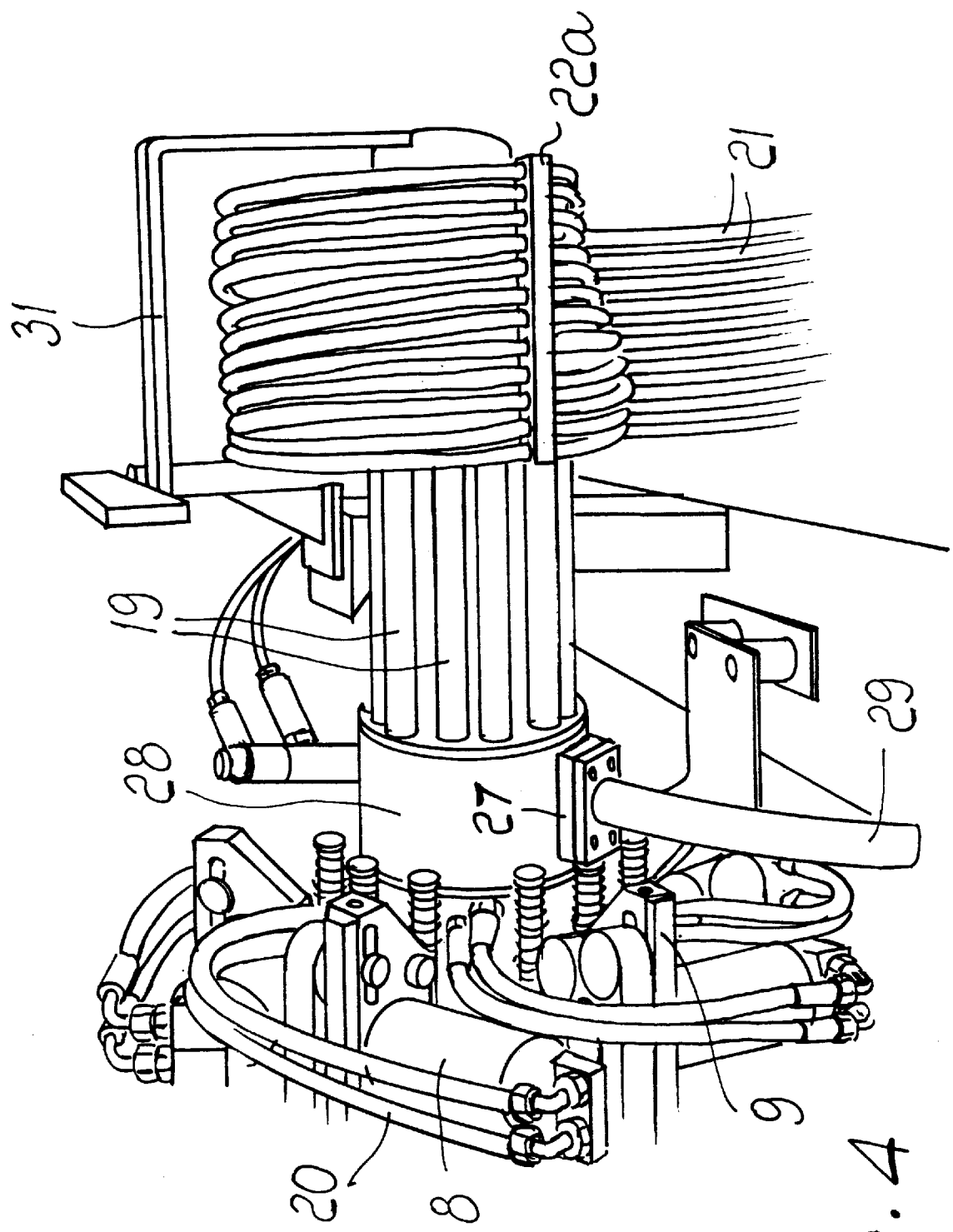

With reference to the above figures, the reference numeral 1 designates the opposite drum feeder end with respect to the end that is associated with a multispindle automatic lathe which must be fed with bars taken from a containment magazine.

The reference numeral 2 designates one of the two vertical sides that limit the frame at the opposite ends and support the rotating part, or drum, of the feeder.

Said drum comprises a tubular beam 3; two respective circular center bearings are centered and fixed to the opposite ends of said beam, and only one of said center bearings, designated by the reference numeral 4, is visible in the drawing.

The center bearings 4 roll on sets of three rollers 5 which cantilever out from the sides 2 so that the drum can rotate about the horizontal axis A.

The guides 6 of the bars to be fed to the lathe lie between the center bearings 4, parallel to the axis A, and are angularly distributed around the axis A. The guides 6 are generally constituted by two half-shells which can be mutually spaced in order to allow the feeding of the bars to be machined.

The advancement of each bar in the respective guide 6 is actuated by a bar pusher, which is coupled to a flexible traction element 7 lying to the side of the guide, parallel thereto.

The flexible elements 7, which in the illustrated example are constituted by toothed belts, are actuated by respective hydraulic motors 8 mounted on L-shaped brackets 9 which are fixed in a cantilevered manner to the center bearing 4.

The reference numerals 10 and 11 designate pulleys which, for each motor, respectively tension the toothed belt 7 and wind it on the driving pulley 12, which is keyed on the output shaft of the motor 8.

In order to connect the motors 8 to a source of pressurized oil and to the discharge there is provided the coupling according to the present invention, which is generally designated by the reference numeral 13 in the drawing.

Said coupling 13 comprises a sleeve 14 which is coupled to the center bearing 4 by means of a flange coaxially to the axis A and has an expanded portion 15 in which a plurality of axial ducts 16 is provided and whose number is twice that of the motors. The axial ducts 16 are angularly distributed about the axis A and end on the front edge of the expanded portion 15 at one end with threaded holes 17, and at the other opposite end, with radial holes 18.

Axial pipes 19 are screwed into the threaded holes 17 and gradually increase, in succession, in length, in a direction away from the threaded holes 17. The pipes 19 are thus parallel to the axis A and their ends lie on a line defining a cylindrical spiral around the axis A.

The motors 8 are connected to the holes 18. In particular, two holes 18 are connected to the inlet and outlet holes of each motor 8 by means of connecting hoses 20 which conveniently, for assembly reasons, are arranged outside the motors.

The axial pipes 19 are connected, by means of flexible hoses 21, to a stationary distributor 22 which is fixed to the frame of the feeder. In order to prevent the pipes 19 from becoming tangled, said pipes are guided through a guiding bracket 22 a which rotates with the axial pipes 19. The flexible hoses 21 are connected to the axial pipes 19 by means of L-shaped unions 23 which are orientated with the hose connection branches so that the flexible hoses 21 are substantially perpendicular to the axis A and tangent to the imaginary cylinder formed by the pipes 19.

The length of the flexible hoses 21 is such that they trace a spiral around the axis A, so as to allow, by utilizing the elasticity of the hoses 21, a complete rotation of the sleeve 14 and therefore of the drum of the feeder with respect to the distributor 22. Advantageously, the spirals of the hoses 21 lie on planes which are perpendicular to the rotation axis A.

The stationary distributor 22 is connected to a source of pressurized oil and comprises multiple electric valves which are controlled so as to connect the intake and the discharge of the oil toward and from said motors 8 according to a preset program. For example, the distribution of pressurized oil can occur cyclically during the rotation of the drum.

The operating prerogatives of the described coupling are the fact that the connection of the motors 8 for the advancement of the bars is not dependent on the rotation of the drum but can be set by programming the opening and closure of the electric valves of the distributor 22.

This greater flexibility of the feeder allows to make the bar advance in any station and to vary at will the number of advancement stations. For example, if in a six-station lathe it is necessary to perform machinings which can be performed in just three stations, it is possible to produce the simultaneous advancement of two bars: one is subjected to the machinings of the first three stations, while the other bar undergoes the same number of machinings in the subsequent three stations.

When the lathe has ended the machining cycle and has thus covered a rotation angle at the most slightly greater than 360°, it is of course returned to the machining start position by performing a rotation of equal extent in the opposite direction.

It should be observed that the described coupling allows machinings according to conventional cycles and with special interventions on the advancement of the bars.

For example, during the pauses of the rotation of the drum all the hydraulic motors can remain connected to the source of oil at a reduced pressure, so that the motors, by rotating in one direction, determine a slight thrust on the bars contained in the guides of the drum.

Numerous modifications and variations are possible in the practical embodiment of the invention.

One of these variations provides, inside the tubular beam 3, a coaxial tubular element 24 which lies inside the sleeve 14 and forms a tubular chamber 25 for collecting the lubricating oil of the rotating bars in the guides 6.

The tubular chamber 25 is connected, through an opening 26 formed in the expansion 15 between the axial ducts 16, to an annular cavity 27 formed by a bush 28 which is sealingly mounted in an external seat of the expansion 15.

The bush 28 is rigidly coupled to the frame of the feeder and is provided with an outlet 29 for the recirculation of the bar lubrication oil.

It should be observed that the tubular structure of the coupling 13 allows the passage, inside the tubular element 24, of electrical cables which, in order to avoid interfering with the pipes 19, are guided through a tubular extension 30 supported by a bracket 31 which is fixed to the frame of the feeder.

The disclosures in Italian Patent Application No. BO97A000536 from which this application claims priority are incorporated herein by reference.

What is claimed is:

1. A hydraulic coupling for distributing pressurized oil from a pressurized oil source to a plurality of hydraulic motors actuators mounted on a rotating structure, wherein the rotating structure is constituted by a drum feeder rotatable about a rotation axis thereof for feeding bars to an automatic multispindle lathe and said actuators are constituted by hydraulic motors which are angularly distributed around said rotation axis, the coupling comprising: a plurality of ducts branching out axially from said feeder and being angularly distributed with respect to said rotation axis, said ducts being connected to delivery and return connections of said motors at a first end thereof; a stationary distributor for connecting said motors to the pressurized oil source and to an oil discharge; flexible hoses for connecting a second end of said ducts opposite to said first end, to said distributor, said flexible hoses being arranged in a spiral around said rotation axis and having a length which allows the rotation of said feeder with respect to said distributor through a preset angle, said distributor being of the valve type for controlling oil flow through said flexible hoses and for connecting the delivery and return connections of oil to and from said motors according to a programmed sequence.

2. The coupling of claim 1, comprising: a sleeve having a flange, and which is coupled to the drum of said feeder through said flange coaxially to the rotation axis of the drum; a plurality of said axial ducts the number whereof being twice that of the motors, said ducts being formed in said sleeve and angularly distributed around the rotation axis of said drum, said ducts including, at a first end, at a front edge of said sleeve, threaded holes; a plurality of axial pipes being screwed in said threaded holes so as to be each in communication with a respective one of said axial ducts, said pipes having different lengths which increase for each one of said pipes, in succession, in a direction away from said threaded holes, and said ducts having, at a second opposite end, radial holes, two of said radial holes being connected to the delivery and the return connections of each motor through connecting hoses, said axial pipes being connected, through said flexible hoses, to the stationary distributor which is fixed to a frame of said feeder; and unions for connection of said flexible hoses to said axial pipes, said unions being L-shaped so as to have each a connection branch thereof for connection to a respective one of said flexible hoses substantially perpendicular to said rotation axis, said flexible hoses having such a length so as to extend spirally around said rotation axis whereby to allow a complete rotation of the sleeve and therefore of the feeder drum with respect to the distributor.

3. The coupling of claim 2, wherein said stationary distributor is connected to the source of pressurized oil and is electrically controlled so as to connect the delivery and the return connections of the oil toward and from said motors according to a preset program.

4. The coupling of claim 3, wherein said feeder comprises: a tubular beam; a coaxial tubular element located inside said sleeve and extending coaxially to and inside said beam, the tubular element and the beam forming a tubular chamber for collecting the lubrication oil for the bars rotating with the feeder; a bush fitted hermetically in an external seat of said sleeve, said bush being rigidly coupled to the structure of the drum feeder and having an outlet for recirculating the bar lubrication oil; an annular cavity located at said bush, said tubular chamber being connected, through an opening formed in said sleeve between said axial ducts, to said annular cavity.

5. The coupling of claim 4, further comprising: a bracket which is fixed to the frame of the drum feeder; and a tubular extension supported by said bracket and located coaxial to said tubular element as a continuation thereof lying between said axial pipes, in order to form a passage for electrical cables which extends along said tubular beam and said tubular element.

6. The coupling of claim 2, further comprising a guiding bracket for guiding therethrough said axial pipes to prevent entanglement thereof during rotation of the drum feeder.

7. A hydraulic coupling for feeding with pressurized fluid from a pressurized fluid source actuators mounted on a structure which is rotatable about a rotation axis thereof, said actuators being angularly distributed around the rotation axis of said structure, the coupling comprising:

a plurality of ducts which branch out axially from said structure and are angularly distributed with respect to said rotation axis, said ducts being connected, at a first end thereof, to delivery and return connections of said actuators;

a stationary distributor for connecting said actuators to the source of pressurized fluid and to a fluid discharge;

flexible hoses for connecting a second end of said ducts, opposite to said first end, to said distributor, said flexible hoses being wound in a spiral around said rotation axis and having a length which allows rotation of said structure with respect to said distributor through a preset angle; ps and wherein said distributor is of the valve type for controlling fluid flow through said flexible hoses and for connecting the delivery and return connections of fluid to and from said actuators according to a programmed sequence.

8. The coupling of claim 7, further comprising:

a sleeve with a flange for coupling the sleeve to said drum feeder, coaxially to said rotation axis;

a plurality of threaded holes, each of which being formed at a first end of a respective one of said axial ducts and so as to open at a front edge of said sleeve, said axial ducts being twice as much as said actuators and being formed in said sleeve;

a plurality of axial pipes screwed at an end thereof in said threaded holes so as to be each in fluid communication with a respective one of said axial ducts, said pipes having different lengths, with said lengths gradually increasing, in succession for each one of said pipes, in a direction away from said threaded holes;

radial holes provided at a second opposite end of said ducts;

connecting hoses for connecting in fluid communication two of said radial holes to the delivery and the return connections of each actuator; and unions for connection of said flexible hoses to said axial pipes, said unions being L-shaped so as to have each a connection branch thereof for connection to a respective one of said flexible hoses substantially perpendicular to said rotation axis, said flexible hoses having such a length so as to extend spirally around said rotation axis to connect said axial pipes to said stationary distributor while allowing a complete rotation of the sleeve and therefore of the feeder drum with respect to the distributor.

* * * * *